United States Patent [19]

Sugiyama et al.

[11] Patent Number: 5,140,815
[45] Date of Patent: Aug. 25, 1992

[54] VALVE APPARATUS

[75] Inventors: Genroku Sugiyama, Ibaraki; Toichi Hirata, Ushiku; Hideaki Tanaka, Tsuchiura; Kazumasa Yuasa; Yusaku Nozawa, both of Ibaraki, all of Japan

[73] Assignee: Hitachi Construction Machinery Co., Ltd., Tokyo, Japan

[21] Appl. No.: 427,126

[22] PCT Filed: Feb. 23, 1989

[86] PCT No.: PCT/JP89/00184
 § 371 Date: Oct. 23, 1989
 § 102(e) Date: Oct. 23, 1989

[87] PCT Pub. No.: WO89/08213
 PCT Pub. Date: Sep. 8, 1989

[30] Foreign Application Priority Data

Feb. 24, 1988 [JP] Japan .................. 63-39696
Oct. 22, 1988 [JP] Japan .................. 63-265241

[51] Int. Cl.⁵ .................................. F16D 31/02
[52] U.S. Cl. ........................... 60/426; 60/460; 91/461
[58] Field of Search .......... 60/460, 461, 466, 426; 91/420, 461, 462, 466

[56] References Cited

U.S. PATENT DOCUMENTS

| 4,201,052 | 5/1980 | Breeden et al. | 60/461 X |
|---|---|---|---|
| 4,531,369 | 7/1985 | Izumi et al. | 60/461 X |
| 4,531,449 | 7/1985 | Reith | 91/420 |
| 4,535,809 | 8/1985 | Andersson | 137/596.14 |
| 4,555,976 | 12/1985 | Wolfges | 91/420 |
| 4,611,527 | 9/1986 | Breeden | 60/461 X |
| 4,644,849 | 2/1987 | Tanaka | 60/466 X |
| 4,732,076 | 3/1988 | Ewald | 60/460 X |
| 4,854,221 | 8/1989 | Tardy | 91/420 |
| 4,945,723 | 8/1990 | Izumi et al. | 60/426 |

FOREIGN PATENT DOCUMENTS

| 0231876 | 8/1987 | European Pat. Off. | |
| 0251172 | 1/1988 | European Pat. Off. | |
| 3237103 | 4/1984 | Fed. Rep. of Germany | 91/420 |
| 55-631 | 1/1980 | Japan . | |
| 20881 | 5/1984 | Japan . | |
| 186804 | 11/1986 | Japan . | |

Primary Examiner—Edward K. Look
Assistant Examiner—F. Daniel Lopez
Attorney, Agent, or Firm—Fay, Sharpe, Beall, Fagan, Minnich & McKee

[57] ABSTRACT

A hydraulic actuator is driven by hydraulic fluid discharged from a hydraulic pump, for controlling driving of the actuator. A valve has a meter-in circuit for introducing the hydraulic fluid discharged from the hydraulic pump into the actuator. The valve also has a meter-out circuit for returning fluid from the actuator, into a tank. The meter-out circuit is provided with a main valve for controlling the return fluid from the actuator, and a pilot circuit including a variable restrictor. When the main valve is closed, the pilot circuit is closed, and when the main valve is open, its degree of opening varies depending upon an amount of restriction of the variable restrictor. A controller varies the amount of restriction of the variable restrictor valve in accordance with the driving pressure of the actuator.

11 Claims, 8 Drawing Sheets

VALVE APPARATUS

TECHNICAL FIELD

The present invention relates to valve apparatuses mounted to hydraulic machines such as construction machines or the like, for controlling driving of hydraulic actuators and, particularly, to a valve apparatus for a hydraulic machine, capable of securing a function equivalent to a counter balance valve with small loss of energy.

BACKGROUND ART

Generally, as disclosed in, for example, JP-A 54-12927, a conventional hydraulic circuit for a hydraulic machine comprises a hydraulic pump, an actuator, for example, a hydraulic motor for driving a load (or an inertia body) by hydraulic fluid from the hydraulic pump, a valve apparatus, for example, a directional control valve for controlling flow of hydraulic fluid supplied to the hydraulic motor from the hydraulic pump to control driving of the hydraulic motor, and a counter balance valve arranged between the directional control valve and the hydraulic motor, for preventing a load in the gravitational direction from causing the hydraulic motor to run away.

In the hydraulic circuit constructed as above, when, for example, the directional control valve is neutral, the hydraulic fluid from the hydraulic pump is not supplied to the hydraulic motor. Further, the hydraulic motor attempts to rotate by the load in the gravitational direction. Since, however, main lines through which return fluid from the hydraulic motor is introduced into a tank are shut off by the counter balance valve, it is impossible to discharge the return fluid. Accordingly, the hydraulic motor is maintained stationary.

When the directional control valve is switched to one direction from the neutral, the hydraulic fluid from the hydraulic pump is supplied to the hydraulic motor through the main line. The counter balance valve is also switched to one direction by the actuator driving pressure generated in the main line for driving the load, that is, a hydraulic-motor driving pressure. Thus, the main line on the discharge side, which has been shut off by the counter balance valve, is brought into communication with the tank. Return fluid discharged from the hydraulic motor is introduced into the tank. The hydraulic motor drives the load in a direction corresponding to the switched direction of the directional control valve, for example, in a direction against the force of gravity.

When the directional control valve is switched to the opposite direction, the hydraulic fluid from the hydraulic pump is supplied to the hydraulic motor through the main line. The counter balance valve is also switched to the opposite direction by the hydraulic-motor driving pressure generated in the main line. Thus, the main line on the discharge side is brought into communication with the tank, and the return fluid from the hydraulic motor is introduced into the tank, so that the hydraulic motor drives the load in the gravitational direction. In this case, if the quantity of the return fluid discharged into the discharge-side main line from the hydraulic motor increases more than the quantity of the hydraulic fluid supplied through the supply-side main line, the hydraulic-motor driving pressure within the supply-side main line decreases so that the counter balance valve is moved toward the neutral. Thus, the discharge-side main line is restricted, whereby the quantity of the return fluid discharged from the hydraulic motor is limited.

In the manner described above, when the load is driven in the gravitational direction, the counter balance valve operates in such a manner that hydraulic-motor driving pressure corresponding to a spring of the counter balance valve is generated in the supply-side main line, to restrict the discharge-side main line thereby limiting the return fluid. For this reason, rotation of the hydraulic motor is prevented from being brought to a valve higher than rotation corresponding to the hydraulic fluid supplied to the hydraulic motor through the supply-side main line, making it possible to prevent running-away of the hydraulic motor in the load direction due to the force of gravity. This is applicable also to a case where another actuator, upon which the inertia force acts, is arranged in substitution for the hydraulic motor.

Additionally, in the above-described conventional hydraulic circuit, the counter balance valve is provided in the main line through which the hydraulic pump communicates with the hydraulic motor, and a large quantity of hydraulic fluid is controlled by the counter balance valve. For this reason, the hydraulic circuit has an energy loss due to pressure loss. Further, an attempt to reduce the pressure loss leads to an increase in size of the counter balance valve, resulting in an increase in the manufacturing cost.

Furthermore, control of the large quantity of hydraulic fluid results in an increase in flow force due to hydraulic fluid acting upon the counter balance valve. It is difficult to design component parts to cope with this flow force. Thus, it is difficult to obtain stable performance.

Moreover, there is disclosed in the specification of U.S. Pat. No. 4,425,759 a valve apparatus which adopts means other than a counter balance valve to provide a function equivalent to the counter balance valve. The arrangement of the valve apparatus is such that two main lines are provided which are connected to a hydraulic actuator, check valves are provided respectively in the main lines for permitting hydraulic fluid to flow only toward the actuator, a pressure limiting valve of hydraulic-pressure control type is provided in a branch main line connected to the actuator in parallel with each check valve, and the pressure limiting valve has an output port which is connected to a return line communicating with a tank. With such arrangement, pressure in the other main line is introduced into a control section of the pressure limiting valve, to vary setting pressure in accordance with pressure within the main line.

In the valve apparatus, by switching-over of the directional control valve, the hydraulic fluid from the hydraulic pump is supplied to the actuator from one main line through the check valve, while hydraulic fluid discharged into the other main line from the actuator is discharged to the tank through the pressure limiting valve. At this time, if the quantity of the return fluid discharged into the discharge-side main line from the actuator increases more than that supplied through the supply-side main line, the actuator driving pressure within the supply-side main line decreases to increase the setting pressure of the pressure limiting valve. Thus, the discharge-side main line is restricted, whereby the quantity of the return fluid discharged from the hydraulic motor is limited.

However, the valve apparatus is the same as the counter balance valve in that the check valves and the pressure limiting valve are arranged in the main lines. Accordingly, problems arise which are similar to those described above in connection with the counter balance valve.

On the other hand, the specification of U.S. Pat. No. 4,535,809 discloses a valve apparatus which controls flow of hydraulic fluid supplied to a hydraulic actuator to control driving thereof. The valve apparatus comprises a main valve of seat type and a pilot circuit provided with a pilot valve for controlling an opening degree of the main valve. In this valve apparatus, the main valve is composed of an inlet port and an outlet port, a valve element of seat type, a variable restrictor having an opening degree varied depending upon displacement of the valve element, and a back pressure chamber communicating with the inlet port through the variable restrictor for biasing the valve element in a valve closing direction. The pilot circuit is connected between the back pressure chamber and the outlet port of the main valve, and is so arranged as to close the main valve when the pilot valve is fully closed and to vary the opening degree of the main valve in accordance with an amount of restriction of the pilot valve. In this connection, the valve apparatus has no means for providing a function equivalent to the above-described counter balance valve.

The invention has been done in view of the actual circumstances of the above-discussed prior art, and it is an object of the invention to provide a valve apparatus capable of securing a function equivalent to a counter balance valve by means of control of a small quantity of flow rate.

DISCLOSURE OF THE INVENTION

In order to achieve the above object, a valve apparatus according to the invention, which is mounted to a hydraulic machine having a hydraulic pump and a hydraulic actuator driven by hydraulic fluid discharged from the hydraulic pump, for controlling driving of said actuator, comprises a meter-in circuit for introducing the hydraulic fluid discharged from said hydraulic pump, into said actuator, and a meter-out circuit for introducing return fluid from said actuator, into a tank, wherein said meter-out circuit is provided with a main valve for controlling the return fluid from said actuator, a pilot circuit including variable restrictor means, said main valve being closed when said pilot circuit is closed, said main valve having an opening degree which is varied depending upon an amount of restriction of said variable restrictor means, and control means for varying the amount of restriction of said variable restrictor means in accordance with driving pressure of said actuator.

With the arrangement of the meter-out circuit of the valve apparatus constructed as above, the variable restrictor means in the pilot circuit of the meter-out circuit is operated in accordance with the driving pressure of the actuator which drives a load or an inertia body in the gravitational direction, and the opening degree of the main valve is controlled in response to the actuation of the variable restrictor means. By doing so, a small flow rate flowing through the pilot circuit is controlled by the variable restrictor means, whereby it is possible to secure a function equivalent to the counter balance valve. Thus, it is possible to eliminate deficiencies attendant upon provision of a counter balance valve.

BEST MODE FOR CARRYING OUT THE INVENTION

Preferred embodiments of the invention will be described below with reference to the drawings.

A valve apparatus according to a first embodiment of the invention will first be described with reference to FIG. 1.

Figure 1:
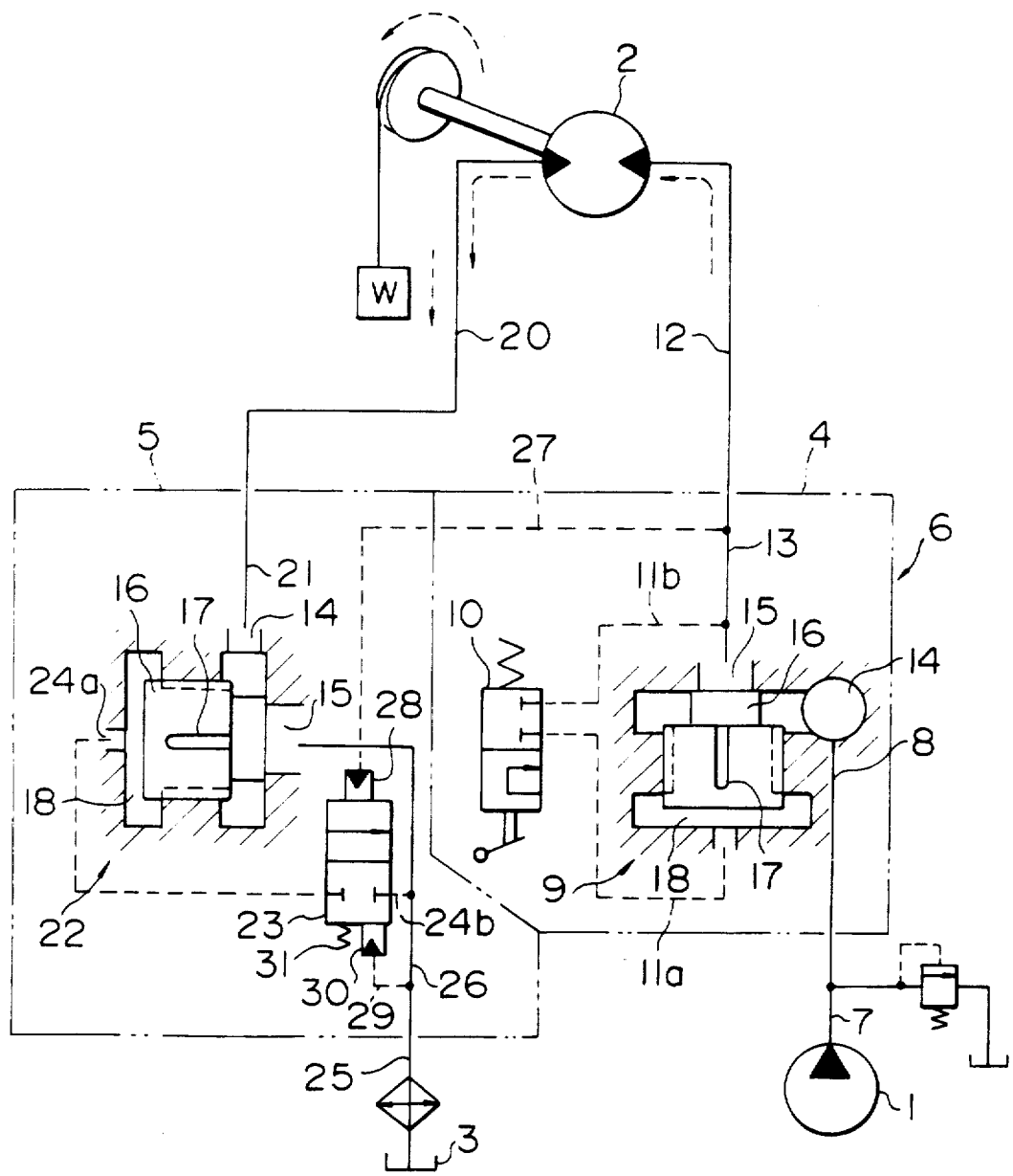
FIG. 1 is a circuit diagram showing a hydraulic circuit including a valve apparatus according to a first embodiment of the invention.

In FIG. 1, a hydraulic circuit is formed by a hydraulic pump 1, a hydraulic actuator, for example, a hydraulic motor 2 driven by hydraulic fluid discharged from the hydraulic pump 1, and a tank 3. Arranged between the hydraulic pump 1 and the tank 3, and the hydraulic motor 2 is a valve apparatus 6 according to the first embodiment of the invention, which comprises a meter-in circuit 4 for controlling hydraulic fluid supplied to the hydraulic motor 2 from the hydraulic pump 1, and a meter-out circuit 5 for controlling return fluid from the hydraulic motor 2 to the tank 3.

The meter-in circuit 4 of the valve apparatus 6 is composed of a main line 8 connected to a discharge line 7 of the hydraulic pump 1, a main valve 9 of seat type, a pilot circuit 11a, 11b provided with a pilot valve 10 for controlling an opening degree of the main valve 9, and a main line 13 connected to a supply-side main line 12 of the hydraulic motor 2. The main valve 9 is composed of an inlet port 14 and an outlet port 15, a valve element 16 of seat type, a variable restrictor 17 formed by a slit having an opening degree varied depending upon displacement of the valve element 16, and a back pressure chamber 18 communicating with the inlet port 14 through the variable restrictor 17 for biasing the valve element 16 in a valve closing direction (upward direction as viewed in the figure). The pilot circuit 11a, 11b is connected between the back pressure chamber 18 and the outlet port 15 of the main valve. The arrangement is such that the main valve 9 is closed when the pilot valve 10 is fully closed, and the opening degree of the main valve 9 is varied depending upon an amount of restriction of the pilot valve 10.

In the valve arrangement constructed as above having a combination of the main valve 9 and the pilot circuit 11a, 11b provided with the pilot valve 10, it is known from the specification of U.S. Pat. No. 4,535,809 that a flow rate substantially proportional to the pilot flow rate flowing through the pilot circuit 11a, 11b flows through the main valve 9. As a result, the pilot flow rate is controlled by the amount of restriction of the pilot valve 10, so that a large flow rate substantially proportional to the pilot flow rate is supplied to the hydraulic motor 2 through the main valve 9.

Further, the meter-out circuit 5 of the valve apparatus 6 comprises a main line 21 connected to a discharge-side main line 20 of the hydraulic motor 2, a main valve 22 of seat type, a pilot circuit 24a, 24b provided with a variable restrictor valve 23 for controlling an opening degree of the main valve 22, and a main line 26 connected to a return line 25 extending to the tank 3. The main valve 22 is constructed similarly to the main valve 9, and the same component parts are designated by the same reference numerals. The pilot circuit 24a, 24b is connected between a back pressure chamber 18 and an outlet port 15 of the main valve 22. The arrangement is such that the main valve 22 is closed when the variable restrictor valve 23 is fully closed, and the opening degree of the main valve 22 is varied depending upon an amount of restriction of the variable restrictor valve 23.

The valve arrangement constructed as above comprising a combination of the main valve 22 and the pilot circuit 24a, 24b provided with the variable restrictor valve 23 functions similarly to the valve arrangement 9, 10, 11a, 11b of the above-described meter-in circuit 4. The pilot flow rate is controlled by the amount of restriction of the variable restrictor valve 23, and a large quantity of flow rate substantially proportional to the pilot flow rate is discharged to the tank 3 through the main valve 22.

The variable restrictor valve 23 of the meter-out circuit 5 is provided with control means for varying the amount of restriction of the variable restrictor valve 23 in accordance with driving pressure of the hydraulic motor 2. This control means is composed of a first pressure-receiving section 28 arranged at one end of the variable restrictor valve 23, the driving pressure from the hydraulic motor 2 being introduced into the first pressure-receiving section through a line 27 connected to the main line 13 of the meter-in circuit 4, a second pressure-receiving section 30 arranged at the other end of the variable restrictor valve 23, outlet pressure of the main valve 22 being introduced into the second pressure-receiving section through a line 29 connected to the main line 26, and a spring 31 arranged on the same side as the second pressure-receiving section 30. Specifically, the first pressure-receiving section 28, the second pressure-receiving section 30 and the spring 31 are so arranged that the force due to pressure at the first pressure-receiving section 28 acts in opposed relation to the force due to pressure at the second pressure-receiving section 30 plus the force due to the spring 31.

Here, let it be supposed that a pressure-receiving area of the first pressure-receiving section 28 is am, and a pressure-receiving area of the second pressure-receiving section 30 is az. Then, these pressure-receiving areas are set to am=az. The amount of restriction of the variable restrictor valve 23 is so controlled that a differential pressure between the driving pressure of the hydraulic motor 2 and the outlet pressure of the main valve 22 is brought to a value equal to or higher than a predetermined pressure. This will be described below.

Let it be supposed that the driving pressure of the hydraulic motor 2 is Pm, the outlet pressure of the main valve 22 is Pz, the spring constant of the spring 31 is Kz, displacement of the spring 31 is z, and an initial value of the displacement is z0. Then, equilibrium among the forces due respectively to the pressures at the first and second pressure-receiving sections 28, 30 and the force of the spring 31 acting upon the variable restrictor valve 23 can be expressed as follows:

$$Pm \cdot am = Pz \cdot az + Kz(z0 + z) \quad (1)$$

Here, am=az. Accordingly, if this relationship is substituted for the equation (1), the following relationship then exists:

$$\begin{aligned} Pm - Pz &= (Kz/am) \cdot (z0 + z) \\ &\geq (Kz/am) \cdot z0 \end{aligned} \quad (2)$$

That is, by the control means comprising the first pressure-receiving section 28, the second pressure-receiving section 30 and the spring 31, the driving of the variable restrictor valve 23 is so controlled that a differential pressure between the driving pressure Pm of the hydraulic motor 2 and the outlet pressure Pz of the main valve 22 is brought to a value equal to or higher than a predetermined pressure (Kz/am)·z0.

The operation of the valve apparatus constructed as above will next be described.

Suppose that, with the hydraulic pump 1 driven, the pilot valve 10 of the meter-in circuit 4 is so operated as to be moved upwardly as viewed in the figure from the illustrated state. Then, the pilot valve 10 is opened, and the valve element 16 of the main valve 9 is moved downwardly as viewed in the figure in accordance with the amount of restriction so that the valve element 16 is opened. Therefore, the hydraulic fluid supplied from the hydraulic pump 1 is introduced into the hydraulic motor 2 through the main lines 7, 8, the main valve 9 and the main lines 13, 12. At this time, the flow rate passing through the main valve 9 is brought to one substantially proportional to the pilot flow rate which is determined in accordance with the amount of restriction of the pilot valve 10 as described previously.

Further, the driving pressure of the hydraulic motor 2 in the main line 13 is introduced into the first pressure-receiving section 28 of the variable restrictor valve 23 through the line 27. Accordingly, the variable restrictor valve 23 is opened, and the valve element 16 of the main valve 22 is moved leftwardly as viewed in the figure in accordance with the amount of restriction so that the valve element 16 is opened. Thus, the return fluid from the hydraulic motor 2 is introduced into the tank 3 through the main lines 20, 21, the main valve 22, and the main lines 26, 25, so that the hydraulic motor 2 is so driven as to move the load in the direction indicated by the broken line.

Here, suppose that the driving pressure Pm of the hydraulic motor 2 is brought, from the state illustrated in FIG. 1, to a value higher than the sum of the outlet pressure Pz of the main valve 22 and the force of the spring 31. Then, the amount of restriction of the variable restrictor valve 23 in the meter-out circuit 5 decreases (the opening degree increases), and the pilot flow rate flowing through the pilot circuit 24a, 24b increases. Conversely, suppose that the driving pressure Pm of the hydraulic motor 2 is brought to a value smaller than the sum of the outlet pressure Pz of the main valve 22 and the force of the spring 31. Then, the amount of restriction of the variable restrictor valve 23 in the meter-out circuit 5 increases (the opening degree decreases), and the pilot flow rate flowing through the pilot circuit 24a, 24b decreases. For this reason, a flow rate substantially proportional to the pilot flow rate flows through the main valve 22 as described previously. Thus, the flow rate passing through the main valve 22 is restricted similarly to the pilot flow rate, and discharge of the return fluid from the hydraulic motor 2 is limited.

Now, this will be considered in view of the above equation (2). When the driving pressure Pm of the hydraulic motor 2 increases so that the differential pressure Pm−Pz between the driving pressure Pm and the outlet pressure Pz of the main valve 22 increases, the displacement of the spring 31, that is, the displacement z of the variable restrictor valve 23 increases. Thus, the amount of restriction at the variable restrictor valve 23 decreases so that the return flow rate flowing out from the main line 20 to the tank 3 through the main valve 22 increases. Further, when the driving pressure Pm of the hydraulic motor 2 decreases so that the differential pressure between the driving pressure Pm and the outlet pressure Pz of the main valve 22 decreases, the displacement z of the variable restrictor valve 23 decreases. Thus, the amount of restriction at the variable restrictor valve 23 increases so that the return flow rate flowing out from the main line 20 to the tank 3 through the main valve 22 decreases.

At this time, the variable restrictor valve 23 is so controlled that the differential pressure between the driving pressure Pm of the hydraulic motor 2 and the outlet pressure Pz of the main valve 22 is brought to a value equal to or higher than the predetermined pressure (Kz/am)·z0. As a result, generation of a cavitation and running-away attendant upon driving of the hydraulic motor 2 are prevented, making it possible to ensure stable driving performance of the hydraulic motor 2.

The first embodiment constructed as above can secure a function equivalent to a counter balance valve by the meter-out circuit 5 which comprises the main valve 22, the pilot circuit 24a, 24b including the variable restrictor valve 23, and the control means for the variable restrictor valve 23 which is composed of the first pressure-receiving section 28, the second pressure-receiving section 30, the spring 31 and the lines 27, 29. Further, the variable restrictor valve 23 controls a small flow rate flowing through the pilot circuit 24a, 24b, and a counter balance valve or substituting means is not arranged in the main lines 8, 12, 13, 20, 21, 26.

Accordingly, energy loss due to pressure loss attendant upon the counter balance valve can be restrained, and an attempt can be made to miniaturize the valve apparatus, making it possible to reduce the manufacturing cost. Further, since the variable restrictor valve 23 controls a small quantity of flow rate, the flow force is low, making it possible to ensure stable performance.

Figure 2:
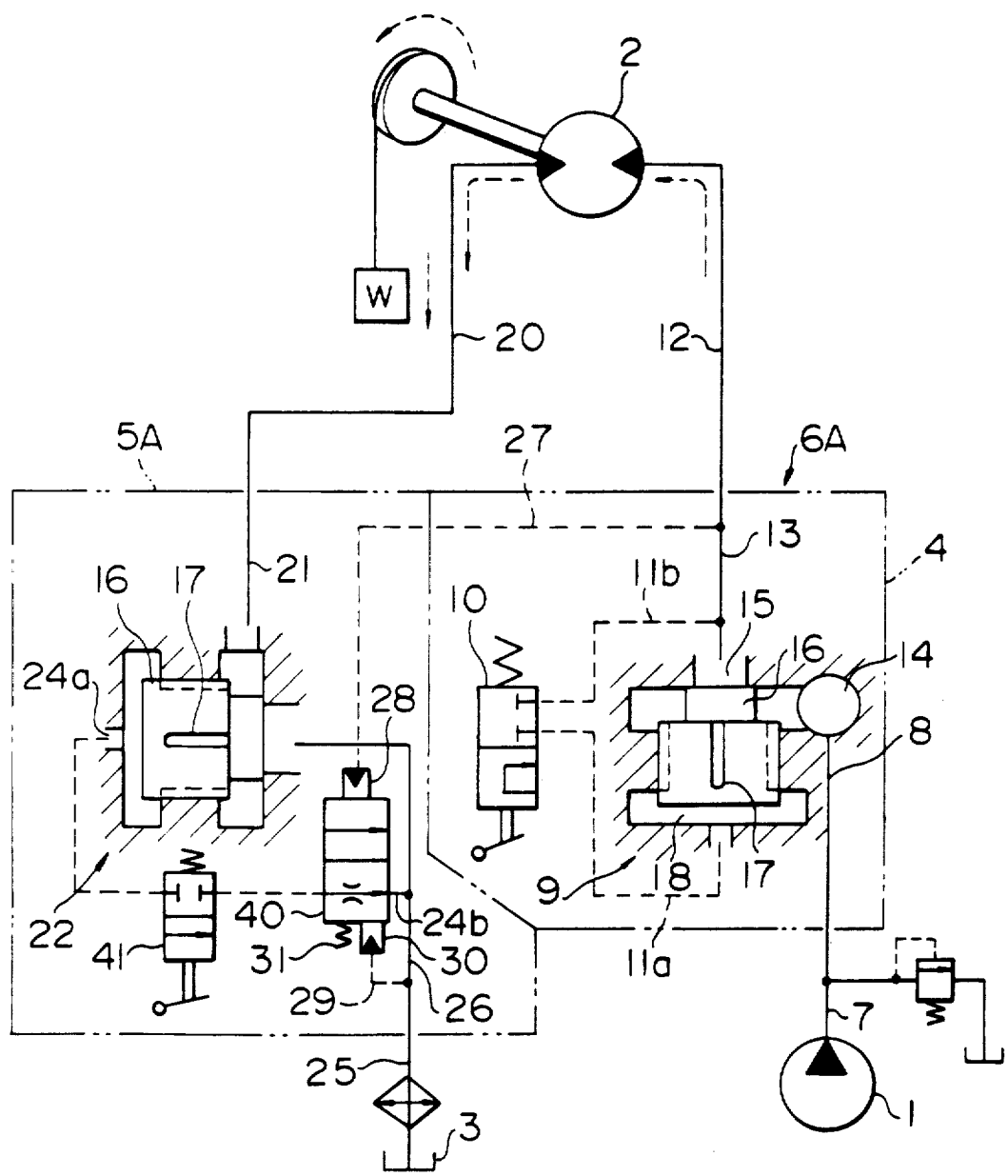
FIG. 2 is a circuit diagram showing a hydraulic circuit including a valve apparatus according to a second embodiment of the invention.

A second embodiment of the invention will be described with reference to FIG. 2. A valve apparatus 6A according to this second embodiment slightly differs from the previously described first embodiment only in an arrangement of a meter-out circuit 5A. Specifically, in the meter-out circuit 5A of this second embodiment, a pilot valve 41 for controlling operation of the main valve 22 is arranged in the pilot circuit 24a, 24b in series relation to a variable restrictor 40 such that the pilot circuit is capable of being closed by the pilot valve 41. Further, the variable restrictor valve 40 is so arranged as not to fully close the pilot circuit at maximum restriction of the variable restrictor valve 40.

With the second embodiment constructed as above, when the pilot valve 10 of the meter-in circuit 4 and the pilot valve 41 of the meter-out circuit 5A are so operated as to be moved upwardly as viewed in the figure respectively from their illustrated states, flow rate control for driving of the hydraulic motor 2 is carried out substantially similarly to the first embodiment. Further, if the driving pressure of the hydraulic motor 2 decreases, the restrictor valve 23 is so operated as to increase (decrease the opening degree) the amount of restriction of the pilot circuit 24a, 24b in the meter-out circuit 5A, to decrease the pilot flow rate flowing through the pilot circuit 24a, 24b. Thus, excessive discharge of the return fluid from the hydraulic motor 2 is restrained, making it possible to secure a function equivalent to a counter balance valve.

Furthermore, in the embodiment, when the pilot valve 41 is operated in the meter-out circuit 5A, the pilot circuit 24a, 24b is not fully closed. Therefore, hunting due to variation in the flow rate and variation in the driving pressure of the hydraulic motor 2 can be prevented, making it possible to ensure stable performance.

Figure 3:
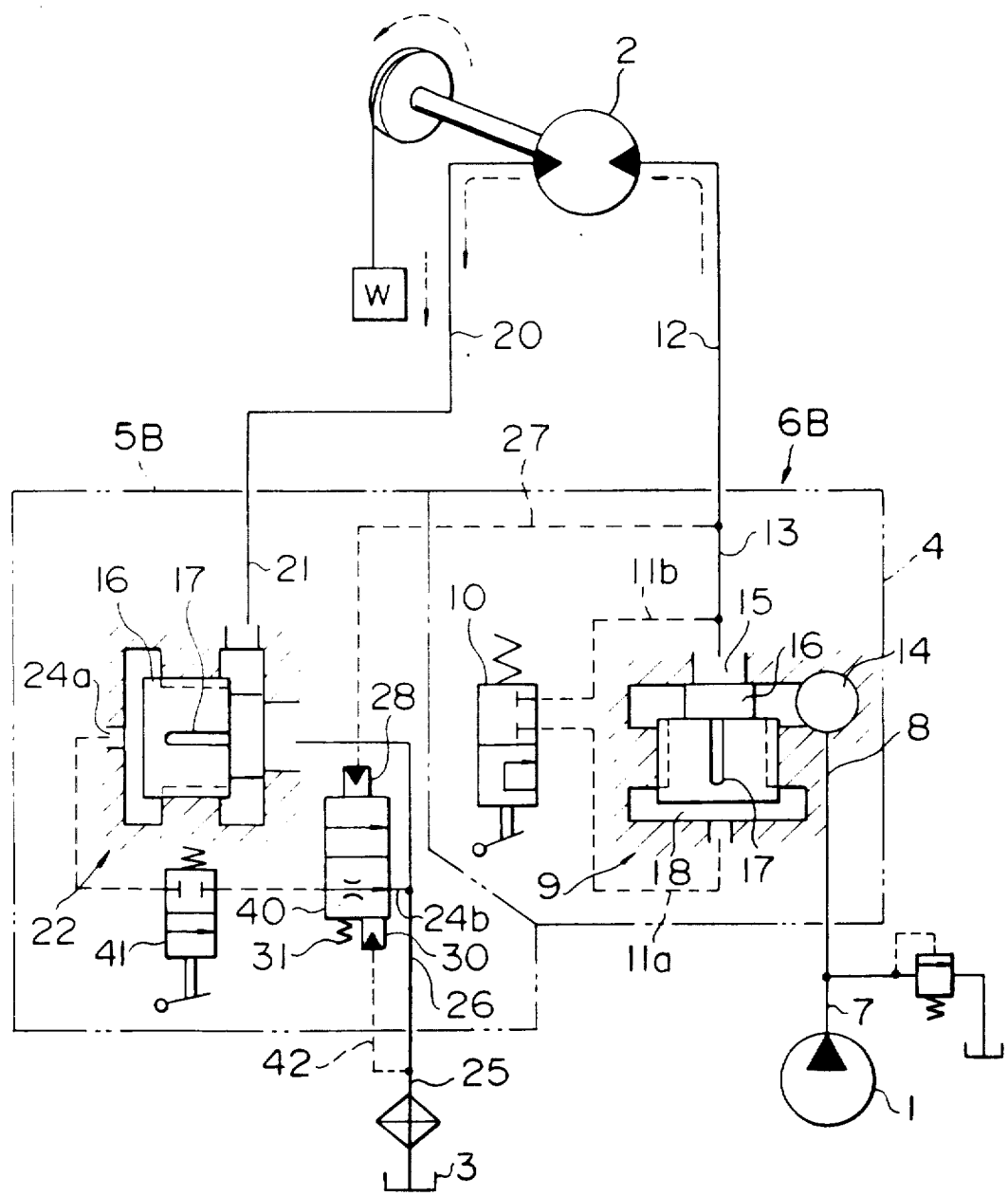
FIG. 3 is a circuit diagram showing a hydraulic circuit including a valve apparatus according to a third embodiment of the invention.

A third embodiment of the invention will be described with reference to FIG. 3. A valve apparatus 6B according to this third embodiment slightly differs from the aforesaid second embodiment only in an arrangement of a meter-out circuit 5B. Specifically, the meter-out circuit 5B of this third embodiment is so arranged that, although the same pressure is maintained downstream of the main valve, the tank pressure in the return line 25 on the outside of the valve apparatus 6B, not the outlet pressure of the main valve 22 within the valve apparatus 6B is introduced, through a line 42, into the second pressure-receiving section 30 arranged on one of the ends of the variable restrictor valve 40 at which the spring 31 is located.

Also in this embodiment, the variable restrictor valve 23 is operated in response to a decrease in the driving pressure of the hydraulic motor 2 to increase the amount of restriction of the pilot circuit in the meter-out circuit 5B. Thus, a function equivalent to a counter balance valve is fulfilled. Further, since, in this embodiment, the tank pressure at this time can be regarded as being substantially constant, Pz on the left-hand side of the previously mentioned equation (2) is constant. Thus, it is possible to control the driving pressure Pm of the hydraulic motor 2 such that the driving pressure Pm is brought to a value equal to or higher than a predetermined value.

Figure 4:
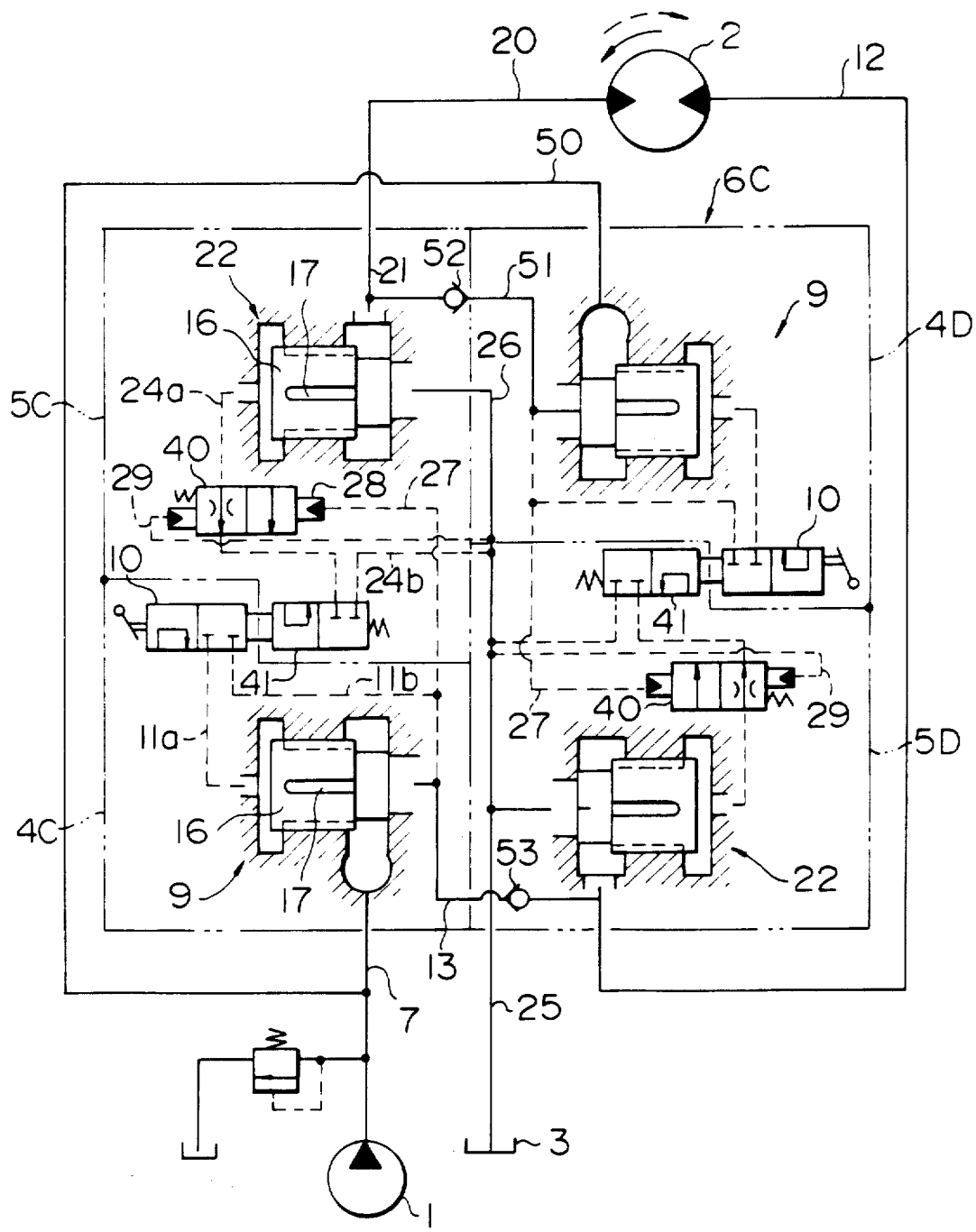
FIG. 4 is a circuit diagram showing a hydraulic circuit including a valve apparatus according to a fourth embodiment of the invention.

A fourth embodiment of the invention will be described with reference to FIG. 4. A valve apparatus 6C according to this fourth embodiment comprises a meter-in circuit 4C and a meter-out circuit 5C which are equivalent respectively to the meter-in circuit 4 and the meter-out circuit 5A of the second embodiment illustrated in FIG. 2. Further, the valve apparatus 6C is provided with a combination of a meter-in circuit 4D and a meter-out circuit 5D which are equivalent in construction respectively to the meter-in circuit 4C and the meter-out circuit 5C. The main valve 9 of the meter-in circuit 4D has an inlet port which is connected to the hydraulic pump 1 through a discharge pipe 50. An outlet port of the main valve 9 is connected to the hydraulic motor 2 through a main line 51, a part of the main line 21 and the main line 20. The main line 51 is provided therein with a check valve 52 for preventing hydraulic fluid from flowing from the hydraulic motor 2. The main valve 22 of the meter-out circuit 5D has an inlet port which is connected to the hydraulic motor 2 through a part of the main line 13 and the main line 12. An outlet port of the main valve 22 is connected to the tank 3 through the main lines 26, 25. The main line 13 is provided therein with a check valve 53 for preventing hydraulic fluid from flowing from the hydraulic motor 2.

The pilot valve 10 of the meter-in circuit 4C and the pilot valve 41 of the meter-out circuit 5C are arranged in united relation to each other, and are interlocked with each other. Further, the pilot valve 10 of the other meter-in circuit 4D and the pilot valve 41 of the meter-out circuit 5D are arranged in united relation to each other, and are interlocked with each other.

With the fourth embodiment constructed as above, when, for example, the pilot valve 10 of the meter-in circuit 4C is operated, the pilot valve 41 also moves in interlocked relation to the pilot valve 10, so that opening degrees of the respective main valves 9, 22 are obtained in accordance with amounts of operation (amounts of restriction) of the respective pilot valves 10, 41. Accordingly, the hydraulic fluid discharged from the hydraulic pump 1 is supplied to the hydraulic motor 2 through the main line 7, the main valve 9 and the main lines 13, 12. The return fluid from the hydraulic motor 2 is returned to the tank 3 through the main lines 20, 21, the main valve 22, the main line 26 and the return line 25. Thus, the hydraulic motor 2 rotates in the direction indicated by the solid line arrow. On the other hand, if the pilot valve 10 of the meter-in circuit 4D is operated, the pilot valve 41 also moves in interlocked relation to the pilot valve 10, so that opening degrees of the respective main valves 9, 22 are obtained in accordance with the amounts of operation (amounts of restriction) of the respective pilot valves 10, 41. Accordingly, the hydraulic fluid discharged from the hydraulic pump 1 is supplied to the hydraulic motor 2 through the main line 50, the main valve 9 and the main lines 51, 21, 20. The return fluid from the hydraulic motor 2 is returned to the tank 3 through the main line 12, the main valve 22, the main line 26 and the return line 25. Thus, the hydraulic motor 2 rotates in the direction indicated by the broken line arrow.

Here, assuming that a load or inertia force in the gravitational direction acts during rotation of the hydraulic motor 2 in the direction indicated by the solid line arrow, then the flow rate flowing through the main line 20 increases following the load or inertia force. If the driving pressure of the main line 12 decreases, the driving pressure is introduced into the first pressure-receiving section 28 of the variable restrictor valve 40 in the meter-out circuit 5C through the line 27, so that the restrictor valve 40 moves in such a direction as to increase the amount of restriction. Thus, a function equivalent to a counter balance valve is fulfilled.

A fifth embodiment of the invention will be described with reference to FIGS. 5 and 6. A valve apparatus 6E according to this fifth embodiment differs from the first embodiment illustrated in FIG. 1 in an arrangement of control means for the variable restrictor valve 23 in a meter-out circuit 5E. Specifically, in the fifth embodiment, the control means for the variable restrictor valve 23 comprises a first pressure-receiving section 61 into which back pressure within the back pressure chamber 18 of the main valve 22 is introduced through a line 60, a second pressure-receiving section 63 into which the inlet pressure of the main valve 22 is introduced through a line 62, a third pressure-receiving section 64 into which the driving pressure of the hydraulic motor 2 is introduced through the line 27, and the spring 31 biasing the variable restrictor valve 23. The first pressure-receiving section 61, the second pressure-receiving section 63, the third pressure-receiving section 64 and the spring 31 are so arranged at the variable restrictor valve 23 that force due to pressure at the first pressure-receiving section 61 and force of the spring 31, and forces due respectively to the pressures at the second and third pressure-receiving sections 63, 64 act in opposed relation to each other.

Let it be supposed that a pressure receiving area of a pressure-receiving section 65 located at the back pressure chamber 18 of the valve element 16 of the main valve 22 is Ac, a pressure receiving area of a pressure-receiving section 66 located at the inlet port 14 of the main-valve valve element 16 is As, and a pressure receiving area of a pressure-receiving section 67 located at the outlet port 15 of the main-valve valve element 16 is Az, and that a pressure receiving area of the first pressure-receiving section 61 of the control means for the variable restrictor valve 23 is ac, a pressure receiving area of the second pressure-receiving section 63 is as, and a pressure receiving area of the third pressure-receiving section 64 is am. Then, these pressure receiving areas are so set that a ratio Ac:As:Az of the pressure receiving areas of the main-valve valve element 16 is made substantially equal to a ratio ac:as:am of the pressure receiving areas of the first through third pressure-receiving sections of the variable-restrictor-valve control means. That is, the pressure receiving areas Ac, As and Az, and ac, as and am are so set as to satisfy the following relationship:

$$ac/Ac = as/As = am/az = K \tag{3}$$

where K is a constant.

In this fifth embodiment, let it be supposed that the driving pressure of the hydraulic motor 2 is Pm, the back pressure of the main valve 22 is Pc, the inlet pressure of the main valve 22 is Ps, the spring constant of the spring 31 is Kz, displacement of the spring 31 is z, and an initial value of the displacement is z0. Then, equilibrium among the forces due respectively to the pressures of the first through third pressure-receiving sections 61, 63, 64 and the force of the spring 31 acting upon the variable restrictor valve 23 can be expressed as follows:

$$Ps \cdot as + Pm \cdot am = Pc \cdot ac + Kz(z0 + z) \tag{4}$$

Further, equilibrium of forces due to the pressures acting upon the valve element 16 of the main valve 22 is as follows:

$$Ps \cdot As + Pz \cdot Az = Pc \cdot Ac \tag{5}$$

Here, if the equation (3) is substituted for the equation (5), the following relationship exits:

$$Ps \cdot as + Pz \cdot am = Pc \cdot ac \tag{6}$$

Further, if the equation (6) is substituted for the equation (4), then the following relationship exits:

$$Pm \cdot am - Pz \cdot am = Kz(z0 + z)$$

that is, $$Pm - Pz = (Kz/am) \cdot (z0 + z) \quad (7)$$
$$\geq (Kz/am) \cdot z0$$

Thus, the same equation as the equation (2) is obtained. Also in the fifth embodiment, by the control means composed of the first through third pressure-receiving sections 61, 63, 64 and the spring 31, driving of the variable restrictor valve 23 is controlled in such a manner that a differential pressure between the driving pressure Pm of the hydraulic motor 2 and the outlet pressure Pz of the main valve 22 is brought to a value equal to or higher than a predetermined pressure (Kz/am)·z0.

As described above, in this embodiment, even if the control means for the variable restrictor valve 23 is so arranged as to employ the main-valve back pressure Pc and the inlet pressure Ps in substitution for the outlet pressure Pz, it is possible to control the differential pressure between the driving pressure Pm of the hydraulic motor 2 and the outlet pressure Pz of the main valve 22 similarly to the first embodiment.

In connection with this embodiment, setting is made such that the ratio Ac:As:Az of the pressure receiving areas and the ratio ac:as:am of the pressure receiving areas are equal to each other, as represented by the equation (3). However, if consideration is made to the influence or the like of the flow force in the main valve 22 and the variable restrictor valve 23, the ratios may not completely coincide with each other.

A sixth embodiment of the invention will be described with reference to FIG. 7. This sixth embodiment is characterized by the connecting relationship between the main valve 22 and the variable restrictor valve 23 which are arranged in a meter-out circuit 70. Specifically, in this embodiment, a spool 71 forming a valve element of the variable restrictor valve 23 is arranged coaxially and slidably with respect to the valve element 16 of the main valve 22. Further, means for introducing the inlet pressure Ps of the main valve 22 into the second pressure-receiving section 63 of the variable restrictor valve 23 is constituted by a passage 72 which is formed within the main-valve valve element 16. The remainder of the arrangement is equivalent to that of the fifth embodiment illustrated in FIG. 6.

Figure 5:
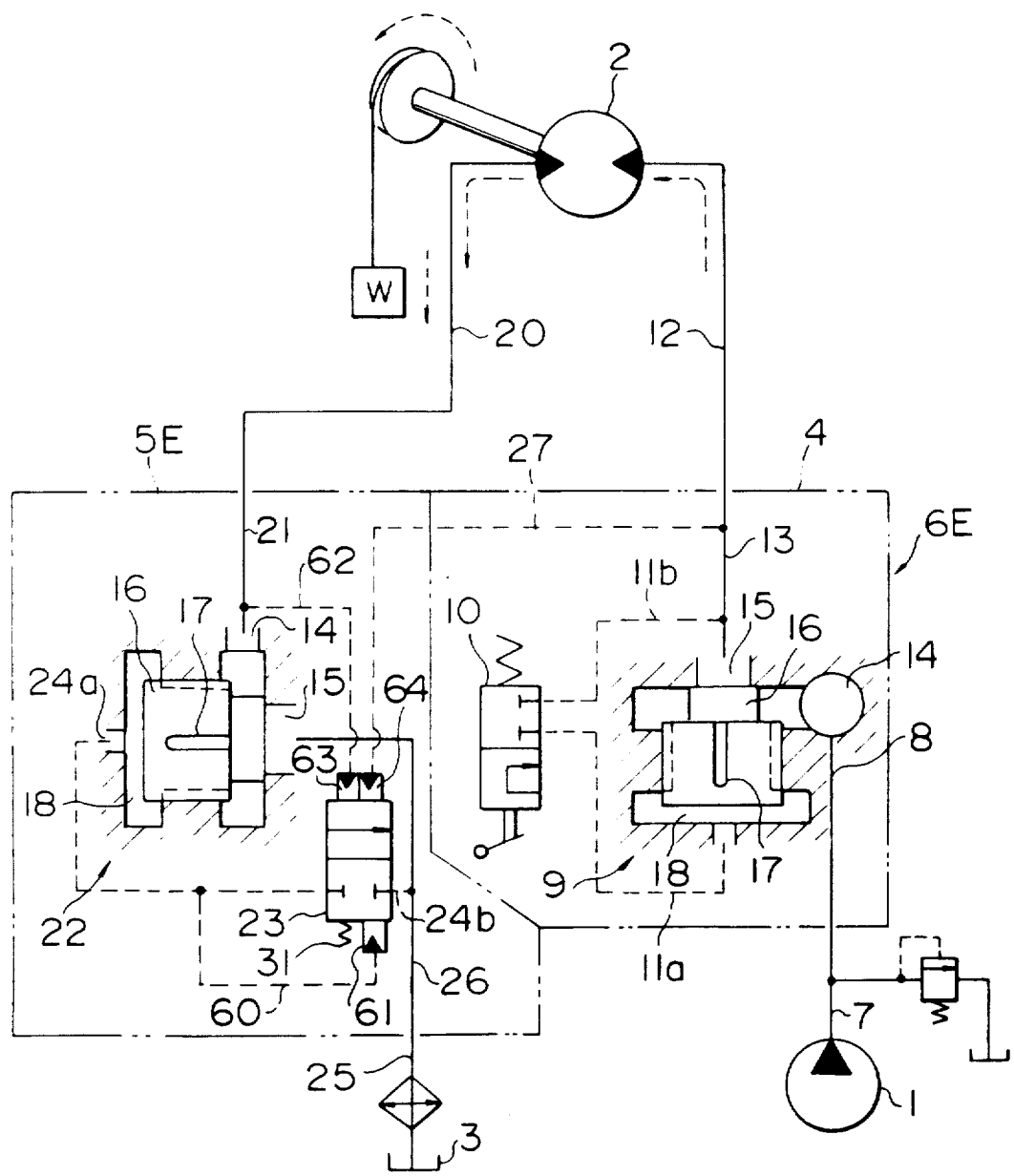
FIG. 5 is a circuit diagram showing a hydraulic circuit including a valve apparatus according to a fifth embodiment of the invention.
Figure 6:
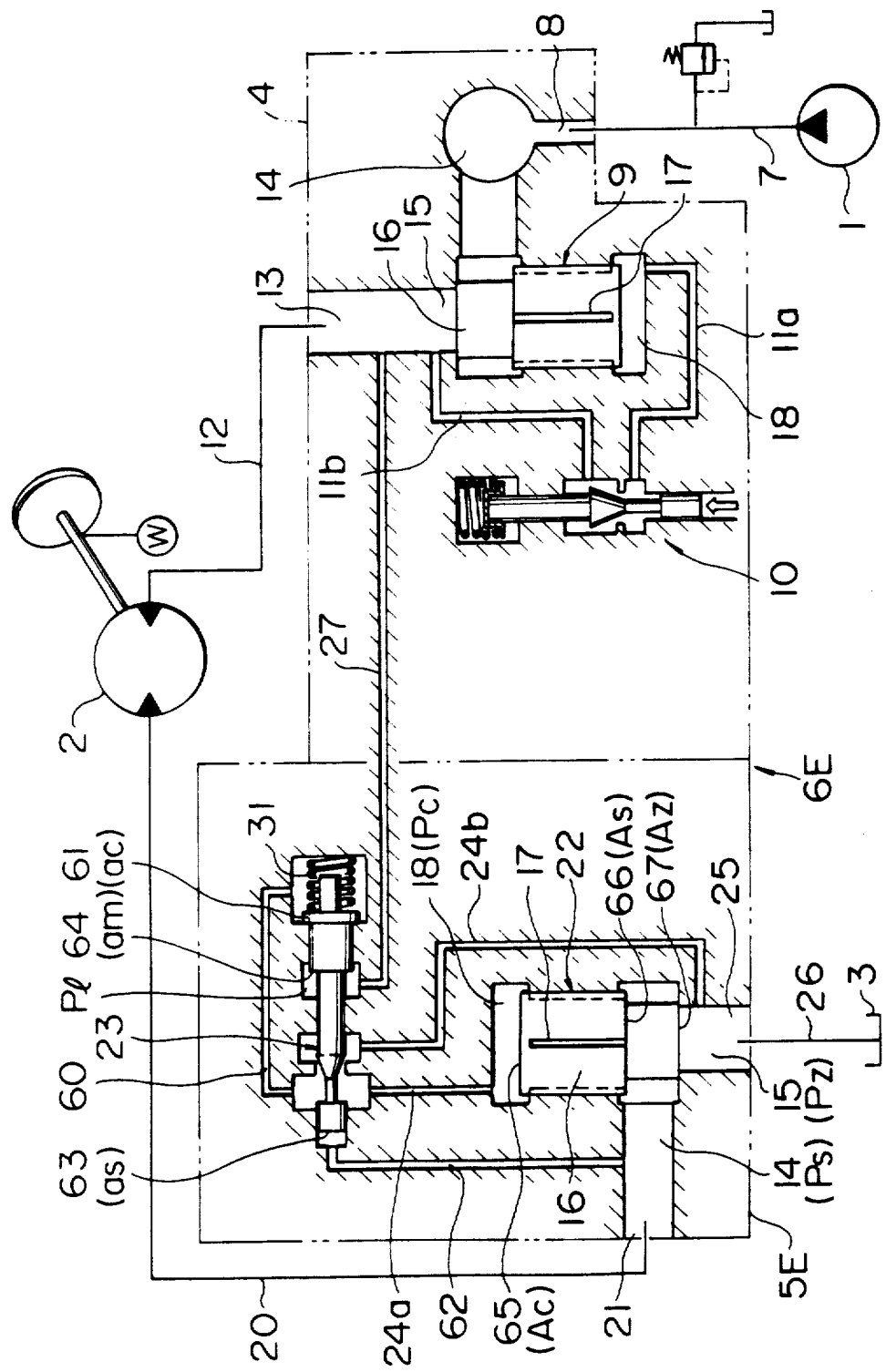
FIG. 6 is a cross-sectional view showing an arrangement of the valve apparatus.

The sixth embodiment constructed as above can obtain advantages equivalent to those of the fifth embodiment illustrated in FIGS. 5 and 6. In addition, since the variable restrictor valve 23 and the main valve 22 are arranged in coaxial relation to each other and are movable relative to each other, the entire arrangement can be made compact. Moreover, simplification of the complicated fluid passages can be realized because only the internal passage 72 is provided. Thus, also in this respect, the manufacturing cost can be reduced.

A seventh embodiment of the invention will be described with reference to FIG. 8. In the seventh embodiment, the pilot valve 41 for controlling operation of the main valve 22 is arranged in the pilot circuit 24b in which the variable restrictor valve 23 forming a meter-out circuit 80 is arranged. The pilot valve 41 is arranged in series relation to the variable restrictor valve 23. Further, a passage 81 is provided through which, for example, the pilot circuit 24b communicates with the back pressure chamber 18, so as not to fully close the pilot circuit 24b at operation of the pilot valve 41. The remainder of the arrangement is equivalent to that of the sixth embodiment illustrated in FIG. 7.

Figure 7:
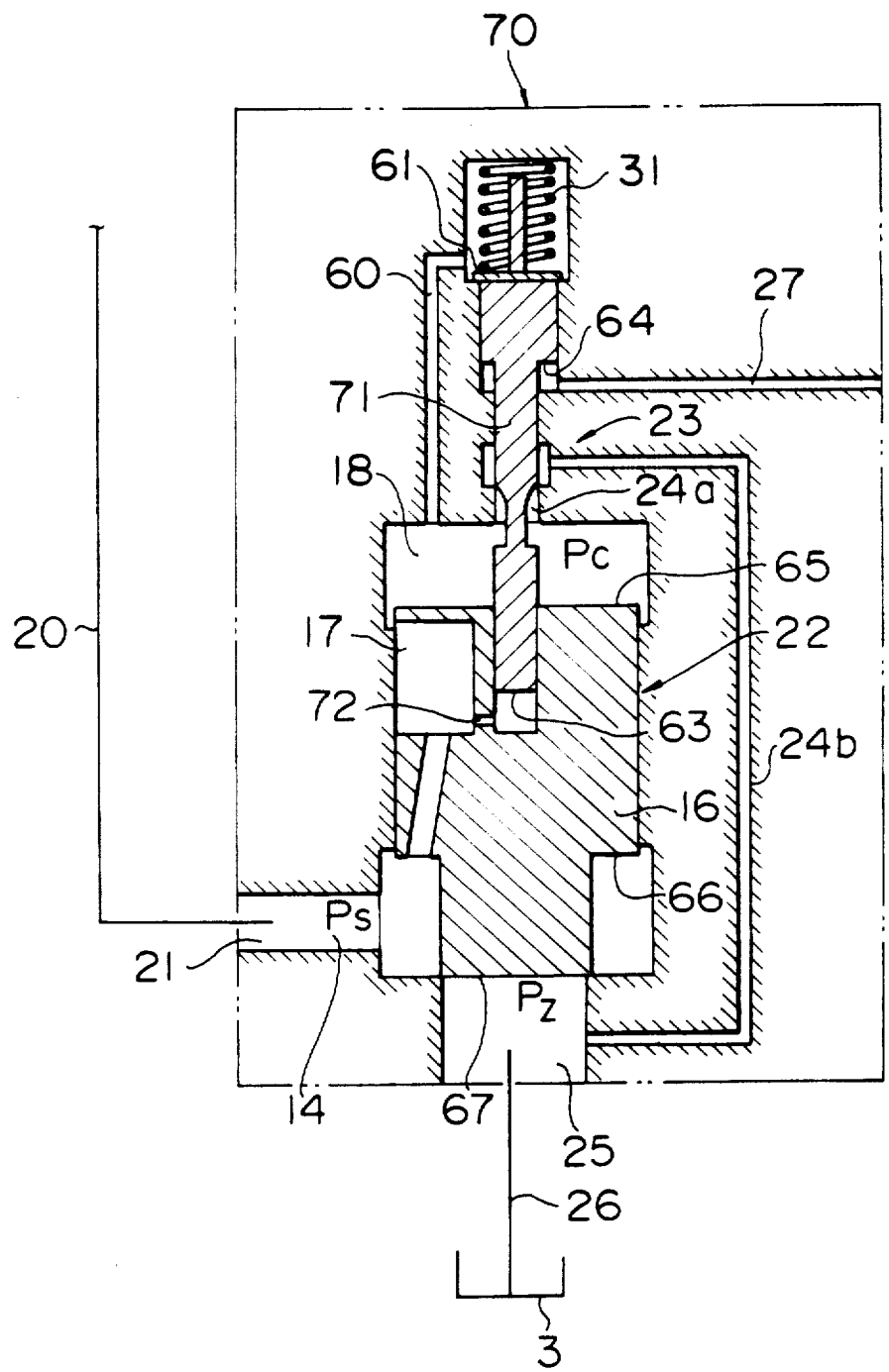
FIG. 7 is a cross-sectional view showing an arrangement of a valve apparatus according to a sixth embodiment of the invention.
Figure 8:
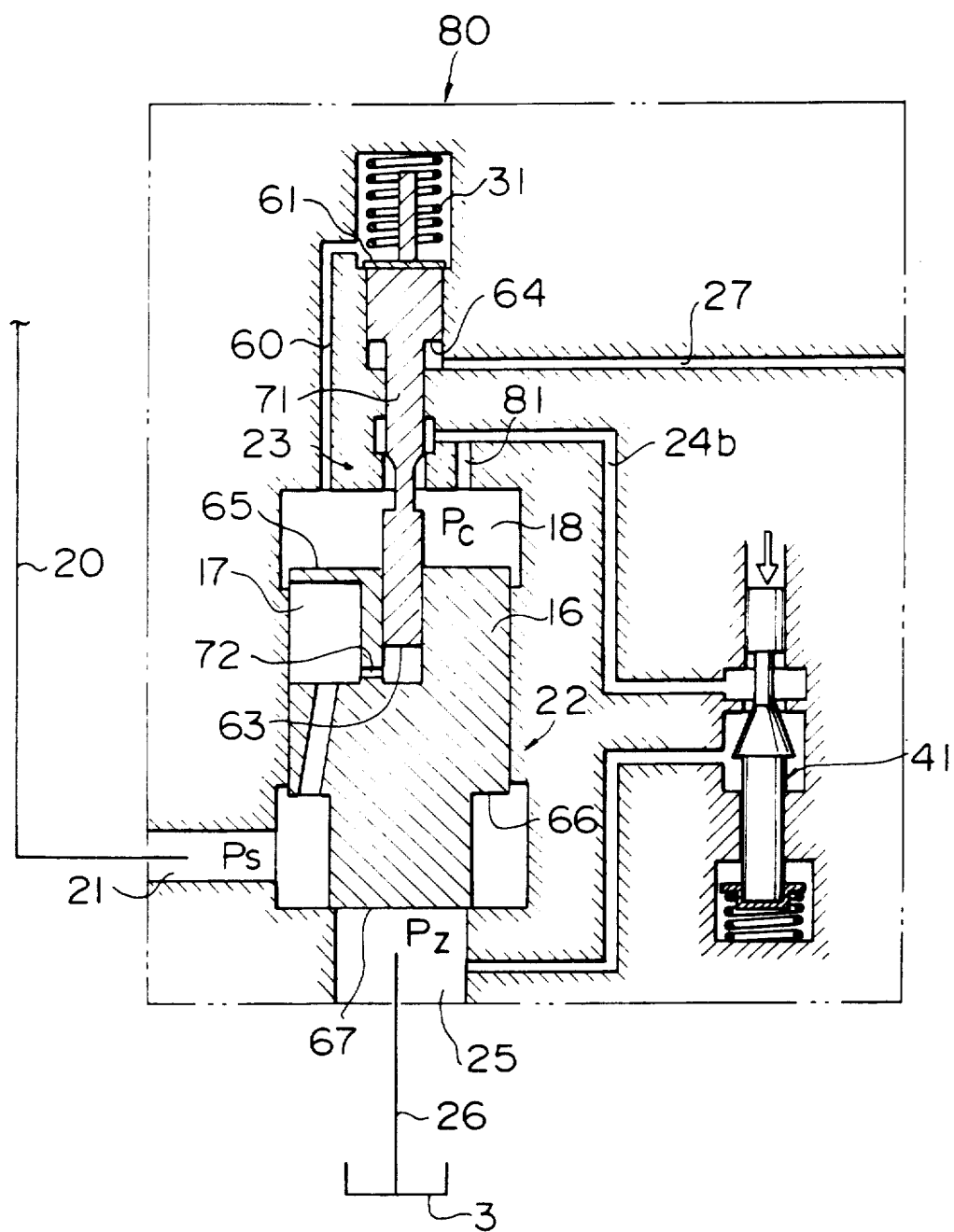
FIG. 8 is a cross-sectional view showing an arrangement of a valve apparatus according to a seventh embodiment of the invention.

The seventh embodiment constructed as above can obtain advantages equivalent to those of the sixth embodiment illustrated in FIG. 7. In addition, since the pilot circuit 24b is not fully closed at operation of the pilot valve 41, hunting due to variation in the flow rate and variation in the driving pressure of the hydraulic motor 2 can be prevented, making it possible to ensure stable performance. That is, it is possible to obtain the advantages of the second embodiment illustrated in FIG. 2.

The valve apparatus according to the invention is constructed as above. Accordingly, a function equivalent to a counter balance valve can be secured by control of a small quantity of flow rate. Therefore, it is possible to restrain energy loss due to pressure loss attendant upon the conventional arrangement in which the counter balance valve is arranged within a main circuit. Further, an attempt can be made to miniaturize the valve apparatus. Thus, the manufacturing cost can be reduced. Furthermore, control of a small quantity of flow rate enables flow force to be restrained low, making it possible to ensure stable performance.

What is claimed is:

1. A valve apparatus for a hydraulic machine comprising a hydraulic pump and a hydraulic actuator driven by hydraulic fluid discharged from the hydraulic pump, for controlling driving of said actuator, comprising:
   a meter-in-circuit for controlling an amount of hydraulic fluid supplied from said hydraulic pump into said actuator;
   a meter-out circuit including first flow control valve means for controlling an amount of hydraulic fluid returned from said actuator into a tank;
   said first flow control valve means having a first main valve for controlling an amount of the return fluid from said actuator, said first main valve including an inlet port and an outlet port, a valve element of seat type, a variable restrictor having an amount of opening variable dependent upon a displacement of the valve element, and a back pressure chamber communicating with the inlet port through the variable restrictor for controlling the displacement of the valve element, and a first pilot circuit for said first main valve, said first pilot circuit being connected between said back pressure chamber and said outlet port of the main valve and including a first pilot valve and pilot variable restrictor means whereby said first pilot circuit controls said first main valve to be closed when said first pilot valve is closed, and further controls said first main valve such that the amount of opening of the first main valve varies depending upon an amount of restriction of said first pilot valve and upon an amount of restriction of said pilot variable restrictor means when said first pilot valve is opened, and control means for varying the amount of restriction of said pilot variable restrictor means depending upon a driving pressure of said actuator generated in said meter-in circuit; and said meter-in circuit having a second flow control valve means.

2. A valve apparatus according to claim 1, wherein said control means varies the amount of restriction of said variable restrictor means in such a manner that a differential pressure between the driving pressure of said actuator and a pressure downstream of said first main valve is brought to a value equal to or higher than a predetermined pressure.

3. A valve apparatus according to claim 2, wherein the pressure downstream of said first main valve is a pressure of said tank.

4. A valve apparatus according to claim 2, wherein the pressure downstream of said first main valve is an outlet pressure of the first main valve.

5. A valve apparatus according to claim 1, wherein said control means comprises a first pressure receiving section arranged on said pilot variable restrictor means to receive the driving pressure of said actuator for applying a corresponding force in an opening direction to said pilot variable restrictor means, a second pressure-receiving section arranged on said pilot variable restrictor means to receive the pressure downstream of said first main valve for applying a corresponding force in a closing direction to said pilot variable restrictor means, and a spring biasing said variable restrictor means in the closing direction.

6. A valve apparatus according to claim 5, wherein the pressure downstream of said first main valve is an outlet pressure of the first main valve.

7. A valve apparatus according to claim 5, wherein the pressure downstream of said first main valve is a pressure of said tank.

8. A valve apparatus according to claim 1, wherein said control means comprises a first pressure-receiving section communicating with said variable restrictor means and receiving a back pressure of said first main valve, a second pressure-receiving section communicating with said variable restrictor means and receiving an inlet pressure of said first main valve, a third pressure-receiving section communicating with said variable restrictor means and receiving the driving pressure of said actuator, and a spring biasing said variable restrictor means such that a force due to the first pressure-receiving section and a force due to said spring act in opposed relation to forces due to said second and third pressure-receiving sections.

9. A valve apparatus according to claim 8, wherein assuming that a pressure receiving area of the back pressure chamber of said first main-valve valve element is Ac, a pressure receiving area of the inlet port of the first main-valve valve element is As, and a pressure receiving area of the outlet port of the first main-valve valve element is Az, and that a pressure receiving area of said first pressure-receiving section of said variable restrictor means is ac, a pressure receiving area of said second pressure-receiving section is as, and a pressure receiving area of said third pressure-receiving section is am, then said pressure receiving areas are predetermined so that a ratio Ac:As:Az of the pressure receiving areas of the first main-valve valve element and a ratio ac:as:am of the pressure receiving areas of the first through third pressure-receiving sections of said variable restrictor means are substantially equal to each other.

10. A valve apparatus according to claim 8, wherein said main-valve valve element and the variable restrictor means coaxially and relatively slidable with respect to each other, and wherein said first main valve includes means for introducing the inlet pressure of said first main valve into the second pressure-receiving section of said variable restrictor means.

11. A valve apparatus according to claim 1, wherein said second flow control valve means has a second main valve for controlling an amount of hydraulic fluid introduced into said actuator, and a second pilot circuit for said second main valve including a second pilot valve, said second pilot circuit controlling said second main valve to be closed when said second pilot valve is closed and further controlling said second main valve to have an opening degree that varies depending upon an amount of restriction of said second pilot valve, the second pilot valve and the first pilot valve being interlocked with each other.

* * * * *